United States Patent [19]
Havansi

[11] Patent Number: 5,930,236
[45] Date of Patent: Jul. 27, 1999

[54] METHOD FOR PREVENTING CIRCULAR ROUTING IN A TELECOMMUNICATION NETWORK

[75] Inventor: Klaus Havansi, Espoo, Finland

[73] Assignee: Nokia Telecommunications Oy, Espoo, Finland

[21] Appl. No.: 08/737,788

[22] PCT Filed: May 24, 1995

[86] PCT No.: PCT/FI95/00286

§ 371 Date: Jan. 28, 1997

§ 102(e) Date: Jan. 28, 1997

[87] PCT Pub. No.: WO95/32571

PCT Pub. Date: Nov. 30, 1995

[30] Foreign Application Priority Data

May 24, 1994 [FI] Finland .................................. 942407
Sep. 20, 1994 [FI] Finland .................................. 944362

[51] Int. Cl.⁶ ........................................................ H04L 1/00
[52] U.S. Cl. ........................... 370/254; 370/385; 370/400
[58] Field of Search .................................. 370/217, 222, 370/225, 251, 256, 258, 264, 384, 496, 522, 524, 236, 255, 218, 254, 385, 400

[56] References Cited

U.S. PATENT DOCUMENTS

| | | |
|---|---|---|
| 4,656,658 | 4/1987 | King . |
| 5,084,816 | 1/1992 | Boese et al. ........................ 395/182.02 |
| 5,088,032 | 2/1992 | Bosack ................................ 395/200.72 |
| 5,239,537 | 8/1993 | Sakauchi ................................ 370/218 |
| 5,241,533 | 8/1993 | Kimoto et al. ........................... 370/227 |
| 5,253,248 | 10/1993 | Dravida et al. ......................... 370/228 |
| 5,265,092 | 11/1993 | Soloway et al. . |
| 5,345,503 | 9/1994 | Lee .......................................... 379/221 |
| 5,481,673 | 1/1996 | Michelson .......................... 395/200.72 |

FOREIGN PATENT DOCUMENTS

| | | |
|---|---|---|
| 398 614 | 11/1990 | European Pat. Off. . |
| 93/19558 | 9/1993 | WIPO . |

Primary Examiner—Chau Nguyen
Assistant Examiner—Soon-Dong Hyun
Attorney, Agent, or Firm—Pillsbury Madison & Sutro LLP

[57] ABSTRACT

A method for preventing circular routing in a telecommunications network, particularly in a common channel signaling network, in which the availability of a particular route is notified by sending particular management message from a node to another. In this case, a node acting as a signal transfer point, sends to its adjacent nodes particular transfer-prohibited messages notifying the adjacent nodes that they must no longer route messages destined to the nodes mentioned in the transfer-prohibited messages via the node that send the transfer-prohibited messages. In order to prevent circular routing without unnecessarily making nodes inaccessible, (a) transfer-prohibited messages used only for preventing circular routing are made distinguishable from the first-described transfer-prohibited messages relating to a particular destination node, a node sends a corresponding message to the adjacent nodes via which it routes messages to that particular destination node, and (c) each node stores route-specific information on the type of the last transfer-prohibited message of either type received.

7 Claims, 4 Drawing Sheets

AS A MESSAGE FROM A SOURCE NODE TO A DESTINATION NODE IS ROUTED, RELY FOR ROUTING ON ROUTING TABLES MAINTAINED BY EACH NODE.

IF A ROUTE SEGMENT BECOMES UNAVAILABLE, SEND UPDATING TRANSFER-PROHIBITED MESSAGES FROM NODE TO NODE FOR UPDATING ROUTING TABLES, INCLUDING SPECIFYING FOR BENEFIT OF NODES THAT CAN DISTINGUISH, WHETHER UNAVAILABILITY IS DUE TO FAILURE OR TO POSSIBILITY OF LOOPING

SEND TEST MESSAGE IF PROPOSING TO ROUTE A MESSAGE ALONG A ROUTE WHOSE STATUS HAS CHANGED TO UNAVAILABLE OR WHICH HAS HAD AN UNAVAILABLE STATUS FOR A PREDETERMINED TIME. PARTLY FOR IDENTIFYING WHICH NODES CAN DISTINGUISH BETWEEN THE TWO TYPES OF UNAVAILABILITY.

A NODE ACTING AS A TRANSFER POINT RECEIVING A TEST MESSAGE, POSSIBLY RESPONDING WITH A TRANSFER-ALLOWED OR TRANSFER-RESTRICTED MESSAGE, AS WELL AS SENDING A TRANSFER-PROHIBITED MESSAGE INDICATING UNAVAILABILITY DUE TO POSSIBILITY OF LOOPING.

FIG. 5 a route transmitting traffic,

METHOD FOR PREVENTING CIRCULAR ROUTING IN A TELECOMMUNICATION NETWORK

BACKGROUND OF THE INVENTION

The invention relates to a method for preventing circular routing in a telecommunication network.

In principle, the solution of the invention is applicable to any communication network, but is, however, primarily intended to improve the management of routing in a common channel signalling system. This signalling system is described in detail in the CCITT blue book *Specifications of Signalling System No. 7* (Melbourne 1988).

In common channel signalling, the method of the invention is limited particularly to the message transfer part (MTP) acting as the transmission system of this network. MTP transfers signalling messages between locations of user functions.

Circular routing refers to a situation where messages sent in a network start to circle in a loop and never reach the destination node. The messages may then even return to the originating node for onward routing towards the same destination.

Point 13 in the CCITT recommendation Q.704 proposes that particular management messages be used for notifying of the unavailability, restriction and availability of a signalling route. These messages include e.g:

transfer-prohibited (TFP) messages whereby the node acting as a signalling transfer point notifies adjacent signalling points that they must no longer route signalling messages via that transfer point, transfer-allowed (TFA) messages whereby the node acting as a signalling transfer point notifies adjacent signalling points that they may route signalling messages via that transfer point and, transfer-restricted (TFR) messages whereby the node acting as a signalling transfer point notifies adjacent signalling points that they should, if possible, no longer route signalling messages via that transfer point. According to the recommendation, transfer-restricted messages are a national option.

Below, transfer-prohibited messages are referred to as TFP messages, transfer-allowed messages as TFA messages and transfer-restricted messages as TFR messages. As a signalling network is concerned, the nodes are also referred to as signalling points. For a more detailed description of the messages, reference is made to the above-identified CCITT recommendation.

Figure 1A:
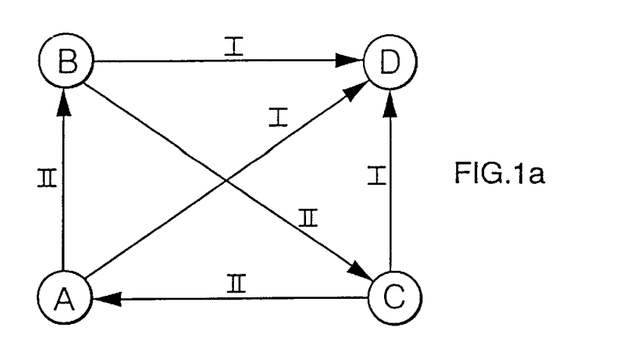
FIGS. 1a through 1d show an example of a network in different situations.

The problem of the procedures described in the CCITT recommendation is that the TFP messages prevent a loop between two points but are unable to prevent loops involving three or more signalling points. This is illustrated by an exemplary network of FIGS. 1a through 1d comprising four signalling points A through D. A primary route, denoted by reference I, and a secondary (standby) route, denoted by reference II, originates from each signalling point. (This example, where standby routes form a loop, cf FIG. 1a, is quite classical.) Following notations are used in the description:

| | |
|---|---|
| A: B AV-EX | a route originating from point A passing subsequently via a channel system leading to point B is in status AV-EX. |

The statuses of the routes are as follows:

| | |
|---|---|
| AV-EX | a route transmitting traffic, |
| AV-SP | an available standby route, |
| UA-link | an unavailable route because of channel system failure. |

With all channel systems leading to point D available (FIG. 1a), routing information of the signalling network to point D is as follows:

| (i) | A: | D AV-EX | B: | D AV-EX | C: | D AV-EX |
|---|---|---|---|---|---|---|
| | | B AV-SP | | C AV-SP | | A AV-SP. |

Figure 1B:
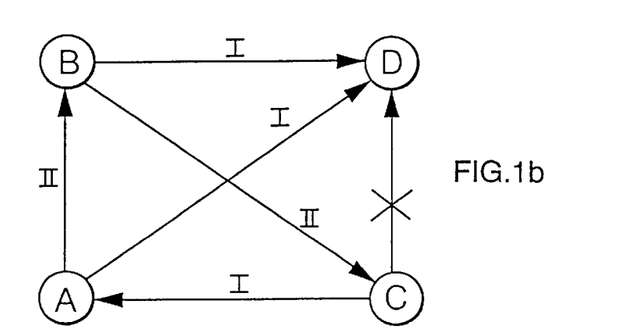

Should channel system C→D fail (FIG. 1b), signalling point C switches to channel system A and sends a TFP message (A→C→D) (a TFP message prohibiting message transmission from point A to point D via point C). The respective route is unavailable to signalling point A, and the routing status remains as:

| (ii) | A: | D AV-EX | B: | D AV-EX | C: | D UA-link |
|---|---|---|---|---|---|---|
| | | B AV-SP | | C AV-SP | | A AV-EX. |

Figure 1C:
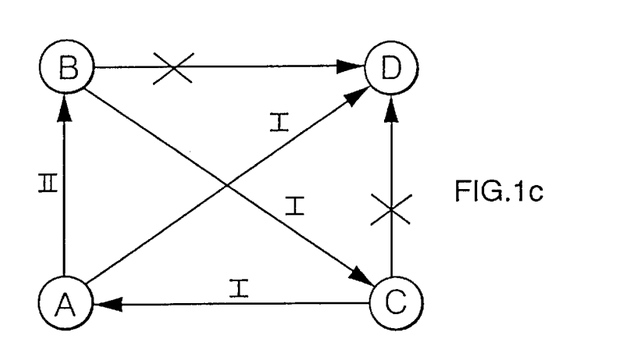

Should channel system B→D fail subsequently (FIG. 1c), signalling point B switches to channel system C and sends a TFP message (C→B→D). Signalling point C does not process the TFP message because the respective route is unavailable to it, and the current routing status is:

| (iii) | A: | D AV-EX | B: | D UA-link | C: | D UA-link |
|---|---|---|---|---|---|---|
| | | B AV-SP | | C AV-SP | | A AV-EX. |

Figure 1D:
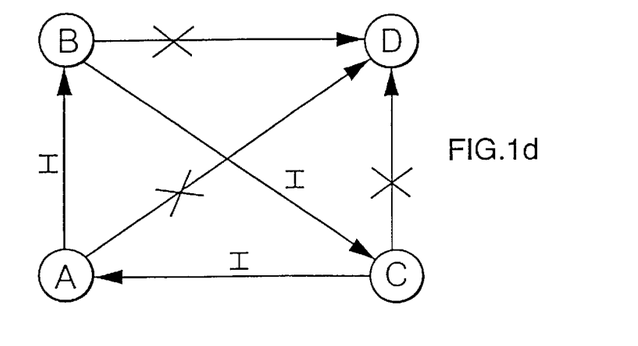

Should channel system A→D fail subsequently (FIG 1d), the present CCITT standards lead to circular routing. Now signalling point A switches to channel system B and sends a TFP message (B→A→D). Signalling point B does not process the TFP message because the respective route is unavailable to it, and the final routing is:

| (iv) | A: | D UA-link | B: | D UA-link | C: | D UA-link |
|---|---|---|---|---|---|---|
| | | B AV-EX | | C AV-EX | | A AV-EX. |

The above describe scenario results in the messages addressed to signalling point D circulating in a loop between points A, B and C until overload causes intra-nodal restarts. These are of no help, and routing always returns to the status (iv).

The above described problem has been recognized and some methods have been realized for preventing the above described circular routing. An improved method (presented by British Telecom) is based on the signalling point sending more frequent TFP messages; having started to direct signalling traffic destined to point X to a standby route, the signalling point (node) sends a TFP message concerning destination point X to all adjacent nodes. When switching onto a standby route, the node in fact prohibits its adjacent nodes from using itself as a transfer point. This prevents circular routing unless a loop is formed from primary routes, but often results in the signalling points being unnecessarily inaccessible.

Figure 2A:
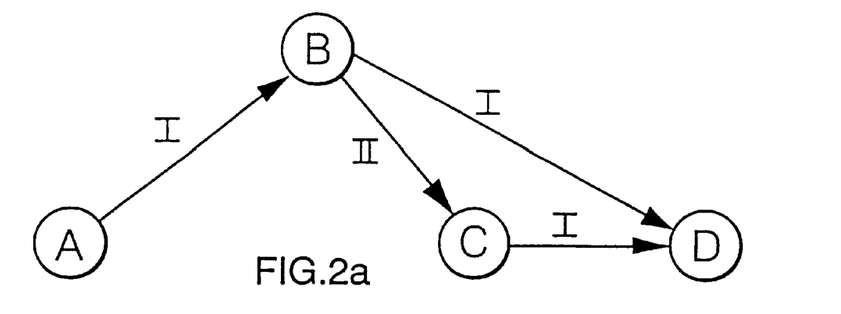
FIGS. 2a and 2b show another example of a network in two different situations.
Figure 2B:
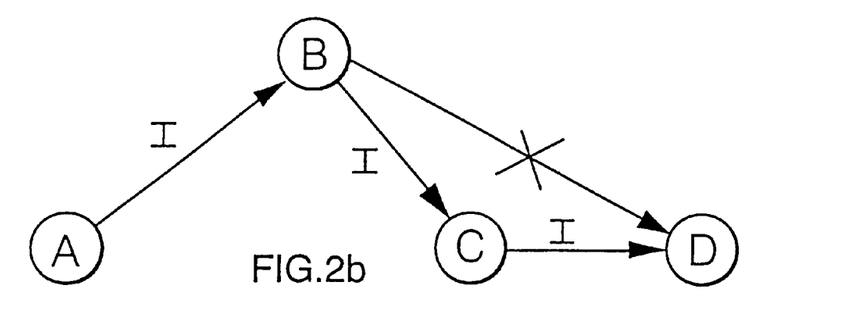

The problems of the latter method are disclosed in a very simple and realistic network presented in FIGS. 2a and 2b, where no circular routing could even occur. Signalling point A (i.e. node A), located furthermost from signalling point D, routes signalling messages destined to point D via point B. Point B may convey the messages to point D either directly or, in an emergency, via point C.

With all channel systems leading to point D available (FIG. 2a), the routing information of the signalling network to point D is (using the above notations):

| (i) | A: | B AV-EX | B: | D AV-EX<br>C AV-SP | C: | D UA-Ex. |
|---|---|---|---|---|---|---|

Should channel system B→D fail (FIG. 2b), signalling point B switches to channel system C and notifies all adjacent points of switching onto a standby route by sending messages TFP(A→B→D) and TFP(C→B→D). Having received the message TFP(A→B→D), signalling point A recognizes that point D is no longer accessible and sends, in turn, a message TFP(B→A→D) (the latter transmission is based on the transfer-prohibited transmission method of the CCITT specification Q.704 point 13.2.2 ii) the final routing status is thus:

| (ii) | A: | D UA-TFP | B: | D DA-link<br>C AV-EX | C: | D AV-EX. |
|---|---|---|---|---|---|---| where UA-TFP indicates that the route is unavailable because of a TFP message.

In the above described method, wherein a TFP message is always sent when switching onto a standby route, a signalling point (point D above) is unnecessarily made inaccessible.

SUMMARY OF THE INVENTION

The object of the present invention is to eliminate the above described disadvantage and to provide a method wherein the signalling point is not unnecessarily made permanently inaccessible, but by means of which circular rerouting may, however, be reliably prevented.

The idea of the invention is to distinguish the TFP messages sent in a network for preventing circular routing from other TFP messages and to send the messages concerning a certain destination node to the adjacent nodes via which the node itself routes messages to said destination node, and to store in a node route-specific information on the type of the last TFP message received.

By means of the method of the invention the network is automatically able to recover from the circumstances which led to circular routing and to find a non-circular routing provided the routing information of the network allows this.

The method sets no equipment requirements on the nodes of a network; they may be realized completely similar as in cases where they comply with the method described in the CCITT. recommendation Q.704 (The minor changes required by the method of the invention, described below, may be realized by node software.) In accordance with a highly preferable embodiment of the invention, the nodes using the method send a new type of test message, different from the known test message, in order for the node receiving the test message to distinguish the nodes using the method from the other network nodes. A major additional advantage of this embodiment is that the nodes using the method are at all times compatible with the nodes not recognizing this method but acting completely in accordance with the CCITT recommendations. Hence all network nodes do not have to be similar, although efficient utilization of the method is subject to several nodes supporting it.

BRIEF DESCRIPTION OF THE DRAWINGS

In the following, invention and its preferred embodiments will be described in greater detail with reference to examples in accordance with the accompanying drawings, in which.

The method of the present invention is also based on more frequent transmission of TFP messages than presented in the CCITT recommendation Q.704. In accordance with the invention, a part of TFP messages, i.e. the messages used only for preventing circular routing, are coded differently from other TFP messages. These messages, also called preventive TFP messages, comply with the CCITT specification Q.704 point 13.2.2 i. According to the recommendation, signalling transfer point Y sends preventive TFP messages concerning destination point X when it starts to route signalling destined to point X via a transfer point Z not currently used by transfer point Y for this traffic. In this case the message is sent to transfer point Z.

Figure 3A:
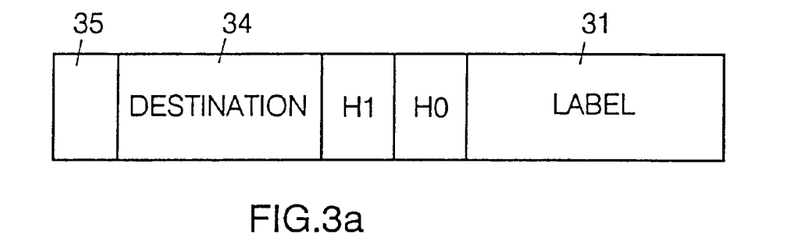
FIG. 3a shows the structure of a transfer-prohibited message.

FIG. 3a shows the structure of a TFP message in the form presented by the CCITT recommendation Q.704. The message comprises first (transmission is from right to left) a 32-bit label field 31 containing information on the transmitter and receiver of the message. The label field is succeeded by a first 4-bit heading code H0, a second 4-bit heading code H1 and a 14-bit destination field 34 indicating to which signalling point the message relates. The message ends in two spare bits 35, coded with the value 00 in all TFP messages in accordance with the recommendations.

In accordance with the invention, the coding of the above described preventive TFP messages is changed so that they may be distinguished from the other TFP messages at a receiving signalling point. This may be accomplished by e.g., coding said spare bits of said TFP messages with a deviating value, e.g. 01.

As these preventive TFP messages (denoted by TFPp below) are distinguishable from other TFP messages, they may be utilized for revealing a loop of at least 3 signalling points. This means that node A receiving a message TFPp (A→B→C) (read: transfer of messages from point A to point C via point B is prohibited because of a loop) must send a corresponding message to all the adjacent signalling points (e.g. D and E) through which it routes signalling messages to point C. Node A must thus change the address point codes to D and E, and send forward the preventive TFP messages otherwise unchanged. In this particular case, it would send the messages TFPp(D→B→C) and TFPp(E→B→C). The same criteria are used when these TFPp messages are sent forward from the subsequent signalling points (sent to the subsequent signalling points through which the signalling point itself routes messages to the destination point). In this way, the message transfer part (MTP) of a signalling system detects a loop one node before it would close.

A signalling point (i.e. a network node) receiving a TFPp message concerning a route it considers available, notes the unavailability of the route and performs rerouting, if possible. In this respect, the signalling point processes these messages like any other TFP messages. Additionally, the signalling point stores route-specific information on the type of the last TFP message received. If a signalling point becomes inaccessible and if using the route leading to it is prohibited by a TFPp message, the message transfer part (MTP) may notify the user that prevention of circular routing is causing the inaccessibility of said signalling point. If the situation persists for more than a few seconds, the message transfer part may generate an alarm signal. The operator may thus check if errors have been made in planning the signalling network. The message transfer part could also ask the OMAP user part defined in the CCITT recommendation Q.795 to check the routing.

When recovery from a situation leading towards circular routing is required, the control procedures of a signalling network must be changed to allow this. The object of the present invention is to limit the changes as far as possible to a state in which using a route is prohibited because of a loop (i. e. a route status caused by a TFPp message received by the signalling point in question). This route status is denoted below by the reference UA-TFPp (route unavailable because of a TFPp message). The method could also be realized e.g., so that when taking into use a route made unavailable by an ordinary TFP message, the procedure would always be the same as when its status is UA-TFPp, but this is not recommendable as it would affect excessively the action of the message transfer part even when the danger of circular routing is nonexistent.

A route in an UA-TFPp status is tested in accordance with the CCITT recommendation Q.704 point 13.5 by sending a test message to an adjacent signalling point for testing if messages to a certain destination point may be routed via that adjacent signalling point. In principle, the testing is effected in the same way as when the route is unavailable because of an ordinary TFP message. The test message is sent (when necessary) for the first time immediately after a TFP or TFPp message.

Figure 3B:
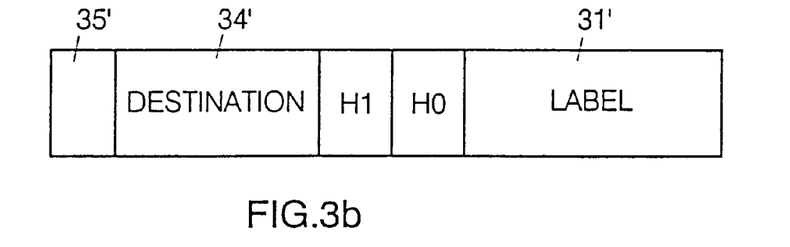
FIG. 3b shows the structure of a test message used in testing the availability of a signalling route.

In accordance with a preferred embodiment of the invention, the coding of the route set test (RST) message is changed so that the receiving signalling point may detect if the transmitting signalling point "knows" the method according to the present invention for preventing circular routing. This may be accomplished by a similar change as with the TFP messages, i.e. by coding the spare bits of an RST messages in a different manner. FIG. 3b shows the structure of an RST message. As the structure corresponds to that of a TFP message (FIG. 3a), corresponding fields are denoted by the same reference numbers, but in FIG. 3b primed numbers are used for denoting that two different messages are involved. (The heading codes H0 and H1 indicate if a message is a TFP or an RST message.) The change in coding RST messages may be effected, e.g. by coding the end part 35, comprising two spare bits, in a different manner, e.g. with the value 01 (in accordance with the CCITT recommendations the end part of all RST messages is coded with the value 00). A test message coded in this new manner is denoted by the abbreviation RSTp below (to distinguish it from the usual test message RST coded in a known manner).

Additionally, small changes have to be made in the response logic of the method as two different types of TFP messages are used therein (the transmission logic functions completely in accordance with the standard). In accordance with the invention, the route set test (RST or RSTp) message is always answered by an ordinary TFP message if that route set is unavailable (according to the CCITT recommendations, no response (TFP message) is given in this case as it is in a way useless because an RST message is meant to be sent when the last message received is a TFP message. However, as the method of the invention uses two types of TFP messages, a response is called for.) Should the taking into use of a route to be tested result in a loop between two signalling points, a preventive TFP message, i.e. a TFPp message, is used in response. If nothing seems to prevent the use of the route to be tested, and the testing signalling point uses the new route set test message (RSTp) in accordance with the preferred embodiment of the invention, an above-described TFA or TFR message is sent at first in response. Immediately thereafter, TFPp messages are sent to the transfer points via which the messages of the route set to be tested are routed, to avoid any kind of oscillation. (According to the CCITT specifications, only a TFA or TFR message is sent in response.) If e.g., node A tests route A→B→D, and messages pass from node B to node D via route B→C→D, node B should send to node C a preventive transfer-prohibited message concerning route C→B→D (TFPp(C→B→D)). If, however, a testing signalling point uses a conventional type of test message (RST), it may thus be assumed (as the testing signalling point uses a new test message RSTp) that it does not "know" the new method for preventing circular routing of the invention, and thus TFPp messages should not be sent as they could cause oscillation (RST-TFA-TFP-RST-TFA-TFP . . . ). After a TFA or TFR message nothing is thus sent. It should be observed that the coding of the RST message does not necessarily have to be changed if it is certain that all network nodes function otherwise in the manner of the invention (i.e. "know" the method for preventing circular routing). It is, however, preferable to change the coding as the above oscillation is thus prevented in all cases (new and old types of nodes are mixed in the network).

If the status of a route is UA-TFPp, which route according to the CCITT recommendation Q.704 would become available after reception of a TFA or TFR message, the route waits, in accordance with the preferred embodiment of the invention, for a certain guard time, in practice about a second, before becoming available. A preventive TFP message (i.e. a TFPp message) concerning that route may arrive after a while, e.g. as a result of the above test, and a guard time is needed to prevent a ping-pong occurrence. When receiving a TFPp message during the guard time, a node may not send a new route set test message, but repeat that message only until a control period T10 of the CCITT recommendation Q.704 has expired. This limitation is used only when the guard time of the invention is effective. Once the node receives a TFA or TFR message in response to an RST message (in practice not later than a second after the transmission of a RST message), the node waits for that guard time, also in the UA-TFP status, before making that route available.

Additionally, when an unavailable route set becomes available (having been unavailable for any reason), transmission of TFA and TFR messages to all adjacent nodes must be delayed for a waiting period of the same length. First TFPp messages must be sent to the points through which messages are routed to the route set that has become available. After a certain waiting period, e.g. about a second, TFA and TFR messages are sent first and the same TFPp messages thereafter. This again prevents a ping pong occurrence (cf point (vii) in the next example). The waiting period ensures that the TFPp messages sent first reach their destination before the TFA and TFR messages. TFPp messages are sent first in order for the receiving end, which has been in an UA-TFP status, to shift to an UA-TFPp status so that it does not immediately react to a TFA or TFR message (as it would in a TFP status), but instead waits for the above second, and thus a ping pong occurrence is prevented.

In the following, the method of the invention will be described by means of an example in accordance with FIGS. 1a through 1d, wherein the standby routes form a loop in the basic situation. The example uses the same notations as above, but here the routes have different statuses according to which type of TFP message has caused the route to become unavailable:

UA-TFPp unavailable because of a TFPp message
UA-TFP unavailable because of an ordinary TFP message.

With all channel systems to point D available (FIG. 1a), the routing information of the signalling network to point D is:

| (i) | A: | D AV-EX<br>B AV-SP | B: | D AV-EX<br>C AV-SP | C: | D AV-EX<br>A AV-SP. |
|---|---|---|---|---|---|---|

In case of failure in channel system C→D (FIG. 1b), point C switches to channel system A and sends a TFPp (A→C→D) message (to point A). Signalling point A does not send this message forward, as it does not route messages to point D via the transfer point. The routing situation will remain as:

| (ii) | A: | D AV-EX<br>B AV-SP | B: | D AV-EX<br>C AV-SP | C: | D UA-link<br>A AV-EX. |
|---|---|---|---|---|---|---|

In case of failure in channel system B→D (FIG. 1c), point B switches to channel system C and sends a TFPp (C→B→D) message. Point C sends the message forward in the form TFPp(A→B→D), as it routes messages destined to point D via point A. Signalling point A will take this message into consideration in its routing tables, but does not send it forward, as in the network it does not route messages to point D via a transfer point. The current routing situation is:

| (iii) | A: | D AV-EX<br>B UA-TFTp | B: | D UA-link<br>C AV-EX | C: | D UA-link<br>A AV-EX. |
|---|---|---|---|---|---|---|

In case of failure in channel system A→D (FIG. 1d), circular routing, which would otherwise be generated (when acting according to the present CCITT standards), may be prevented by means of the method of the invention. If the channel systems fails, signalling point A notices that point D is no longer accessible to it. This is because point A has previously received a TFPp(A→B→D) message, and after the failure both routes are thus unavailable. As a result point A notifies all adjacent points of the situation, in accordance with the transmission-prohibited method, by messages TFP (B→A→D) and TFP(C→A→D). Similarly, having received the TFP message, signalling point C notices that point D is no longer accessible to it. Point C sends corresponding messages TFP(A→C→D) and TFP(B→C→D). Hereby point B also detects the inaccessibility of point D and sends messages TFP(A→B→D) and TFP(C→B→D). Lastly, point A updates the status of the route passing via point B to its routing table, whereat the final routing is:

| (iv) | A: | D UA-link<br>B AV-TFP | B: | D UA-link<br>C UA-TFP | C: | D UA-link<br>A UA-TFP. |
|---|---|---|---|---|---|---|

The above described scenario results in a situation where messages may no longer be sent, but circular routing has also been prevented.

Figure 4A:
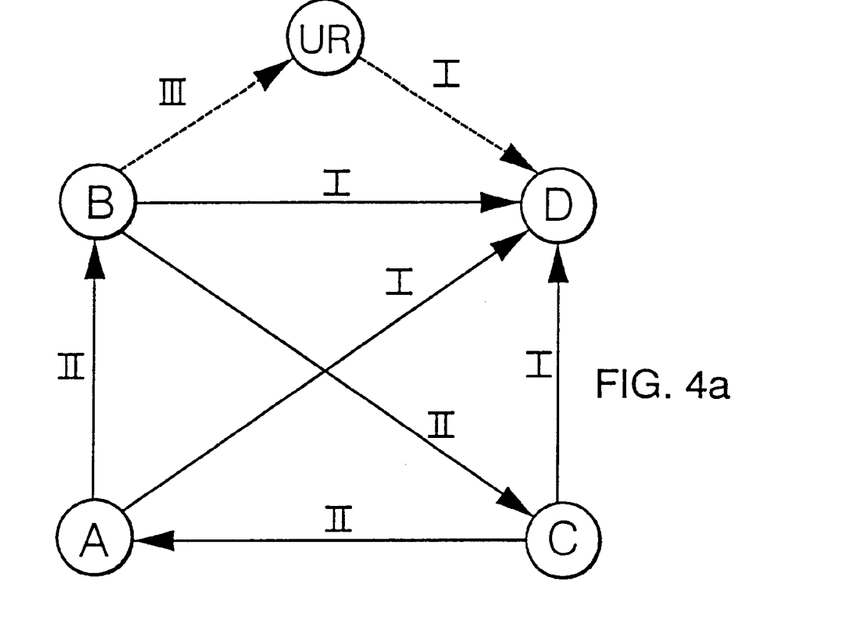
FIGS. 4a and 4b show two different situations involving a network where a node has been added to the network of FIG. 1

If a route existed from point B to point D via point UR in accordance with FIG. 4a, and signalling traffic were not transferred to that route until the two other routes were unavailable, routing tables would look in phase (iii) as follows:

| (v) | A: | D AV-EX<br>B UA-TFPp | B: | D UA-link<br>C AV-EX<br>UR AV-SP | C: | D UA-link<br>A AV-EX | UR: | D AV-EX. |
|---|---|---|---|---|---|---|---|---|

Figure 4B:
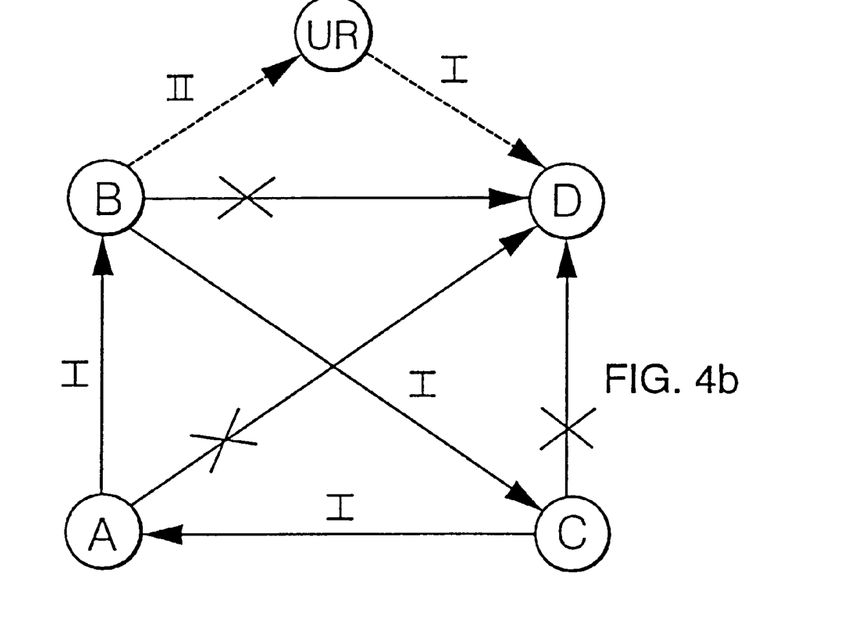
Figure 5:
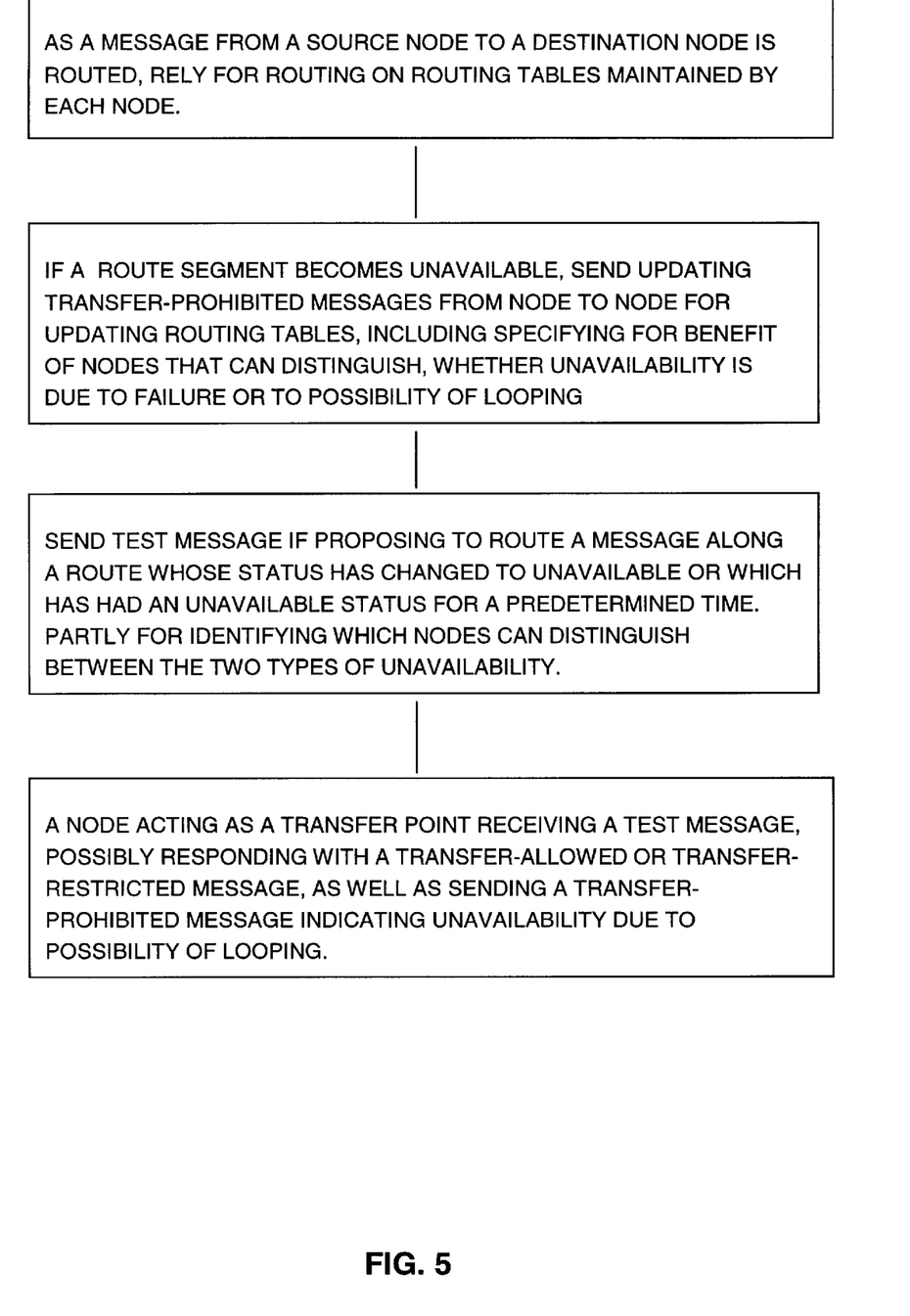
FIG. 5 is a flow chart illustrating the method of the invention.

If channel system A→D fails at this point (FIG. 4b), signalling point A notices, as in the corresponding situation above, that point D is no longer accessible to it and notifies, in accordance with the transfer-prohibited method, all adjacent points by messages TFP(B→A→D) and TFP (C→A→D). After receipt of a respective TFP message, signalling point C also notices that point D is inaccessible. Consequently point C sends messages TFP(A→C→D) and TFP(B→C→D), as described above. Signalling point B has to reroute traffic to point D via point UR. In association with the rerouting signal point B it sends messages TFA (C→B→D) (this message is a TFA message according to CCITT specification Q.704 point 13.3.2 i, allowing point B to route messages destined to point D via point C, which is now allowed) and TFPp(UR→B→D). These messages cause no further action, and for a while routing remains in the status:

| (vi) | A: | D UA-link<br>B UA-TFPp | B: | D UA-link<br>C AV-TFP<br>UR AV-EX | C: | D UA-link<br>A AV-TFP | UR: | D AV-EX. |
|---|---|---|---|---|---|---|---|---|

As the route in an UA-TFPp status is tested in the same manner as the route in an UA-TFP status (cf point 13.5 in the above specifications), signalling point A sends no later than after approximately half a minute a route set test message RST(A→B→D) (i.e. point A inquires of point B if routing is allowed from point A to point D via point B). Point B answers as described above by messages TFA(A→B→D) and TFPp(UR→B→D). Having received a TFA message, point A waits for the above described guard time for potential re-sent TFPp messages. These do not, however, arrive, as point UR does not send forward the TFPp message it received. Thus, point A starts routing traffic to point D via point B, and the route status is:

| (vii) | A: | D UA-link<br>B AV-EX | B: | D UA-link<br>C UA-TFP<br>UR AV-EX | C: | D UA-link<br>A UA-TFP | UR: | D AV-EX. |
|---|---|---|---|---|---|---|---|---|

Signalling point A notifies its adjacent points that point D is again accessible to it by first sending a message TFPp (B→A→D) and, after a waiting period of approximately one second, messages TFA(C→A→D) and TFPp(B→A→D). Point B sends forward messages TFPp(UR→A→D) but point UR does not react as it does not route messages to point D via a transfer point. Instead, on reception of a TFA message, point C notices that point D is again accessible to it and sends first a TFPp(A→C→D) message. This TFPp message is conveyed from point A to point B in the form TFPp(B→C→D). The status has become:

| (viii) | A: | D UA-link<br>B AV-EX | B: | D UA-link<br>C UA-TFPp<br>UR AV-EX | C: | D UA-link<br>A AV-EX | UR: | D AV-EX. |
|---|---|---|---|---|---|---|---|---|

Having waited for approximately a second, point C sends a message TFA(B→C→D) and re-sends the message TFPp (A→C→D). When receiving a TFA message, point B starts to wait for a TFPp(B→C→D) message. Point A sends this message to point B, having received a TFPp(A→C→D) message. Thus, point B does not perform rerouting, and the status (viii) prevails. At a proper time, when point B sends a route set test message RST(B→C→D), the same occurs. The status (viii) prevails until a route set directed to point D is again available (or until failure in the route set between points UR and D).

As is evident from the above, the method of the invention is completely compatible with nodes unfamiliar with this method functioning purely in accordance with the CCITT recommendations. Such nodes interpret TFPp messages as regular TFP messages and act accordingly.

Even though the invention has been explained in the above with reference to examples in accordance with the accompanying drawings, it is obvious that the invention is not restricted to them but can be modified within the scope of the inventive idea disclosed in the above and in the attached claims. E.g., buffering realized with delays is not necessary, but without it the risk of oscillation increases (the above described ping pong occurrence).

I claim:
1. A method for preventing circular routing in a telecommunication network which is a common channel signaling network having a plurality of nodes, comprising the steps of:
 establishing a message routing system according to which each message is routed along a respective route from a respective source node to a respective destination mode;
 each node maintaining a respective routing table containing status information as to routes potentially available to the respective node for routing messages in said network via respective adjacent ones of said nodes;
 providing in said message routing system that transmission of each message from a respective said node to an adjacent respective said node, along a respective route, is based on respective status information in the routing table of the respective said node which is conducting such transmission;
 providing in said message routing system status information that unavailability of a particular route for routing each said message to be routed exists by sending respective transfer-prohibited messages from node to node among respective ones of said plurality of nodes, in each of which a respective said node positioned to act as a signal transfer point notifies respective adjacent ones of said nodes that these respective adjacent ones of said nodes must not thereafter until otherwise notified route messages destined for any destination node referred to in the respective transfer prohibited message via the respective said signal transfer point;
 providing in said message routing system that any said node, in connection with attempting to route a message from a respective source node to a respective destination node, in a situation where availability of an intended respective said route is in question, to send to a respective adjacent node along said intended respective said route a special test message;
 in connection with said providing in said message routing system that unavailability of a particular route for routing each said message to be routed exists, providing for said transfer-prohibited messages to be of two different types, which are distinctly recognizable by those of said nodes which receive such transfer-prohibited messages, these being a first type, which indicates that a particular route is not to be used because that particular route includes a failure, and a second type, which indicates that a particular route, if used, could result in circular routing of the respective said message to be routed.

2. The method of claim 1, wherein:

each said node, in connection with attempting to route a message from a respective source node to a respective destination node, in a situation where availability of an intended respective said node is in question, sending to a respective adjacent node along said intended respective route a special test message upon the occurrence of either of the following events:
  (a) the respective said node has received a respective said transfer prohibited message of said first type or said second type which has caused the respective status of the intended respective route to be changed, in the routing table of the respective said node, from available to unavailable; and
  (b) a predetermined amount of time has elapsed since said status has changed from available to unavailable.

3. The method of claim 1, further comprising:

providing in said message routing system that said first and second types of transfer-prohibiting messages have similar coding, except for reserving certain bits as spare bits in each first type of transfer-prohibiting message, but using corresponding bits in each said second type of transfer-prohibiting message as coding for indicating that the respective transfer-prohibiting message is one of said second type.

4. The method of claim 2, further including:

each said node, in connection with attempting to route a message from a respective source node to a respective destination node, in a situation where availability of an intended respective said route is in question, sending to a respective adjacent node along said intended respective said route a respective special test message, as provided for in said message routing system, said special test message being structured to identify to the respective adjacent node which receives said special test message that the respective said node which sent said special test message is one which is capable of participating in said method by being able to distinguish between said first and second types of transfer-prohibited messages, each said node, when receiving a transfer-prohibited message of said second type, in regard to a respective destination node, sending a corresponding second type of transfer-prohibited message to each respective adjacent node by which the respective said node has a potential to route messages to be routed, to the respective said destination node; and each said node, as part of said maintaining of said routing table thereof, storing route-specific information as to the type of transfer-prohibited message most recently received in relation to each of said potentially available routes.

5. The method of claim 4, further comprising:

a respective adjacent node along said intended respective said route, sending to said node which sent said special test message, a management message denoting availability of said intended respective said route; and said message routing system making said intended respective said route available to said node which sent said special test message only after a guard time having a predetermined length has elapsed since said management message is received by said node which sent said special test message, without said management message having been effectively countermanded.

6. The method of claim 4, further comprising:

said intended respective said route changing from being unavailable to becoming available;

thereafter, a respective said node first sending at least one transfer-prohibited message of said second type, for limiting alternatives available in regard to said intended respective said route; and thereafter sending to said node which sent said special test message, a management message denoting availability of said intended respective said route.

7. The method of claim 4, further comprising:

a respective signaling point neighboring said node which sent said special test message upon receiving said special test message, determining that said special test message identifies said node which sent said special test message as being one that is capable of participating in said method by being able to distinguish between said first and second types of transfer-prohibited messages, sending one of a transfer-allowed message and a transfer-restricted message, and also sending to a respective adjacent transfer point along said respective intended route, a respective transfer-prohibited message of said second type.

* * * * *